Patented May 9, 1944

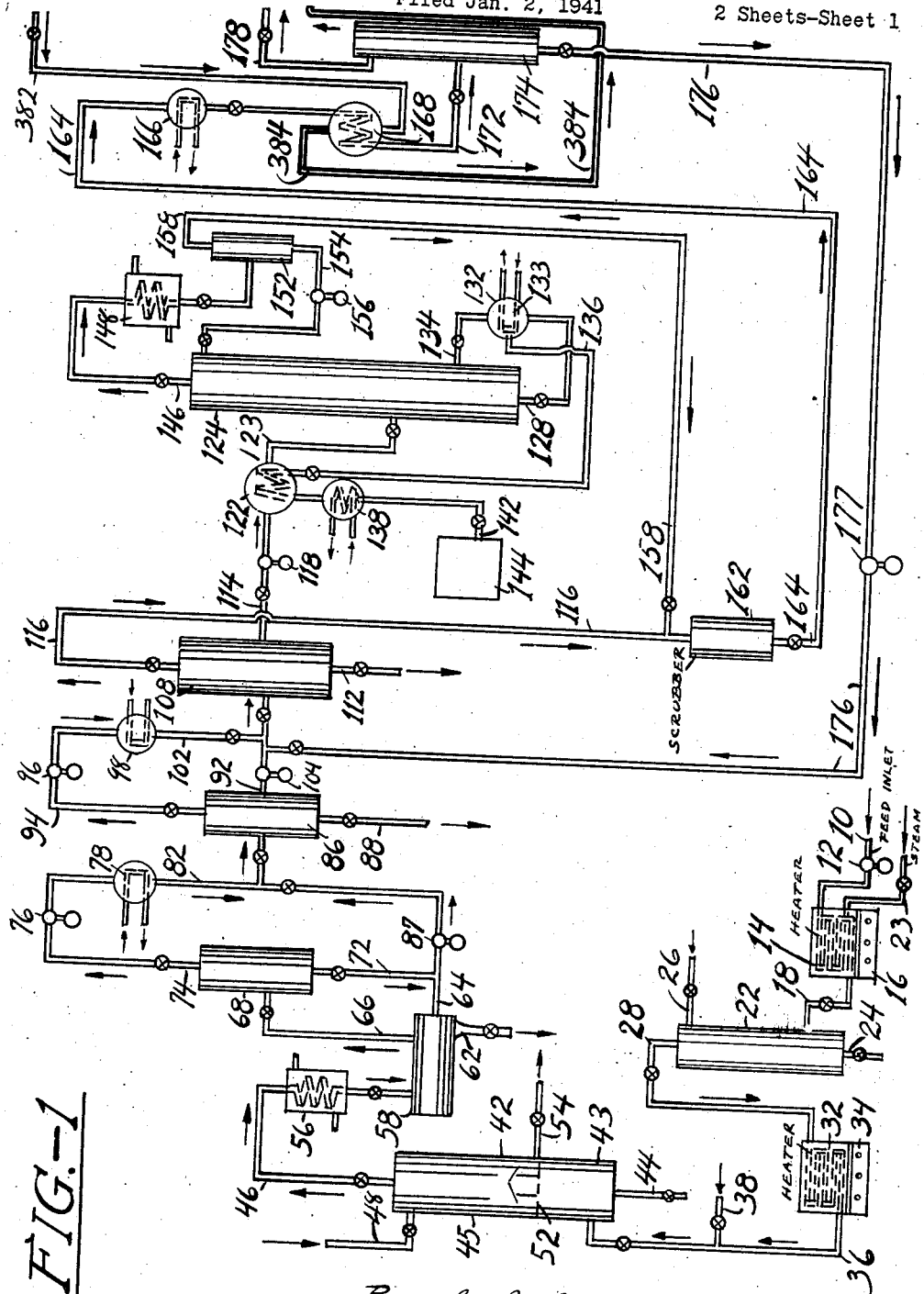

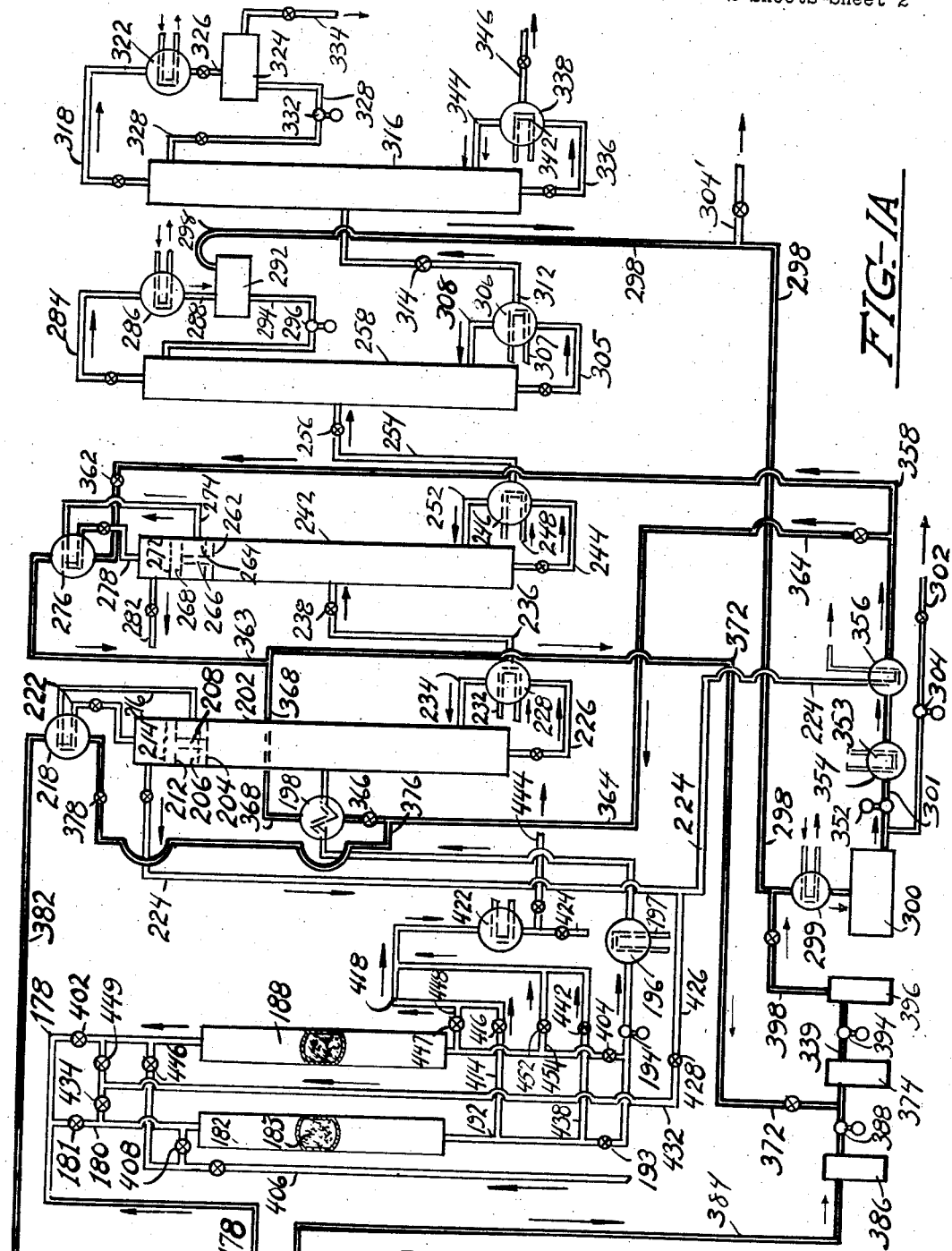

2,348,659

UNITED STATES PATENT OFFICE 2,348,659

TREATING FLUID MIXTURES

Brook I. Smith, and Edward G. Morin, Elizabeth, N. J., assignors to Standard Oil Development Company, a corporation of Delaware Application January 2, 1941, Serial No. 372,854

16 Claims. (Cl. 62—175.5)

This invention relates to the separation of hydrocarbon mixtures into desired fractions and more particularly relates to a process for separating reaction products into desired hydrocarbon cuts having different molecular weights such as $C_2$, $C_3$, $C_4$, etc. fractions.

In the cracking of hydrocarbon oil, if a relatively high temperature and steam are used, the reaction products or products of conversion contain olefins and aromatic constituents. This invention is especially adapted for separating olefins such as ethylene and other hydrocarbons from the reaction products resulting from conversion of hydrocarbons. However, the invention is adapted for use in separating desired fractions from mixtures of hydrocarbon gases.

The products of conversion are cooled, the water removed and the normally liquid hydrocarbons and the hydrocarbon gases are compressed and cooled as separate streams and are then passed into a last drum wherein liquids are separated from gases. The separated liquid is passed to a fractionating tower to remove $C_4$ and lighter hydrocarbons from an aromatic fraction containing gasoline constituents which is withdrawn from the bottom of the fractionating tower. The vapors separated in the last drum, above-mentioned, are mixed with the separated $C_4$ and lighter hydrocarbons leaving the fractionating tower, the mixture is cooled and passed to a separator to separate condensed liquid from vapors and gases. The separated liquid is returned to the drum above referred to.

The vapors and gases are dehydrated or dried, compressed, cooled and fractionated in a first fractionating tower to separate the lighter constituents as overhead vapors from heavier constituents. This fraction is a dilute ethylene fraction and contains ethylene, methane and hydrogen. The bottoms from the first fractionator are passed to a second fractionator in which the bottoms are fractionated and an overhead fraction comprising mostly ethylene leaves the second fractionator. The bottoms from the second fractionator are passed to a third fractionating tower where they are fractionated to separate a $C_3$ cut as an overhead fraction from bottoms which contain $C_4$ and higher hydrocarbons. The bottoms from the last mentioned fractionating tower are passed to a final fractionating tower and fractionated to separate a $C_4$ fraction as overhead vapors and a bottoms containing light aromatic gasoline constituents.

Refrigeration is used for providing reflux for the first two fractionating towers described above and for condensing a portion of the feed to the first tower. A $C_3$ cut is used as the refrigerant with a portion of the overhead fraction from the third tower being used as makeup. This fraction although containing substantial amounts of ethane and propane is predominantly propylene. Hereinafter the refrigerant will be referred to as propylene. Cold propylene gas from the propylene evaporator on the first tower is used for cooling the gas stream before it is passed to the dehydrators or driers.

The dilute ethylene fraction is preferably used for cooling the liquefied propylene before the dilute ethylene fraction is removed from the system.

The dehydrators become inactivated after being in use for a certain period of time and they are revivified by passing hot natural gas therethrough. However, regeneration of the dehydrators may be accomplished by the use of other hot gas streams at the proper temperature. After the dehydrators have been dried and before putting them on stream, a portion of the cold dilute ethylene fraction may be passed through the dehydrators for cooling them to the proper temperature.

In the drawings there is shown in Figures 1 and 1A a diagrammatic representation for one form of apparatus adapted for carrying out the process of this invention but the invention is not to be restricted thereto as other forms of apparatus may be used. Figure 1A forms a continuation of Figure 1.

Referring now to the drawings, the reference character 10 designates a line through which a relatively heavy oil such as gas oil, reduced crude, or the like, is passed by means of pump 12. The oil is fed through a heating coil 14 in a furnace 16 for heating the oil to a temperature below cracking but sufficient to substantially completely vaporize the oil. The heated and vaporized oil is passed through line 18 and into a separating tower 22. Superheated steam is preferably added to the hydrocarbon oil during heating in the coil 14 as at 23. The vaporizing furnace 16 is shown in greater detail in the case filed concurrently herewith in the names of Brook I. Smith and John E. Donahue and bearing Serial No. 372,855.

In the separator 22 unvaporized constituents are separated from vapors and withdrawn from the bottom thereof through line 24. The vapors are fractionated in the separator 22 and preferably suitable reflux is introduced into the top of the separating tower 22 through line 26. The vapors passing overhead are at a temperature of about 800° F. and contain hydrocarbons and steam. The vapors are passed through a conversion coil 32 in a furnace 34 for heating the hydrocarbons to an elevated temperature between about 1200° F. and 1300° F., preferably about 1260° F. In order to crack the hydrocarbons and produce olefins and aromatic constituents. The conversion furnace 34 is shown in greater detail in the above-named case.

The products of conversion are passed through line 36, are quenched by the introduction of a quench oil through line 38 and the quenched products below a cracking temperature are introduced into a separating and fractionating tower 42 to separate liquid residue from vapors in the lower portion 43 of the tower 42. The liquid residue is withdrawn from the bottom of the separator 43 through line 44.

The separated vapors are fractionated in the fractionating section 45 of the tower 42 to separate condensate oil from lighter constituents. The lighter constituents pass overhead as vapors through line 46 and are further treated as will be presently described. Preferably reflux is introduced into the fractionating section 45 through line 48. Condensate oil collecting on the trap-out tray 52 is preferably withdrawn therefrom through line 54. The overhead vapors in line 46 contain ethylene, methane, hydrogen, steam, $C_3$, $C_4$ and heavier hydrocarbons. One example of a hydrocarbon mixture to be separated is as follows:

*Composition of product from furnace in line 36*

| | Mol. Percent |
|---|---|
| $H_2O$ | 34.7 |
| $H_2$ | 3.7 |
| $CH_4$ | 12.6 |
| $C_2H_4$ | 13.1 |
| $C_2H_6$ | 5.2 |
| $C_3H_6$ | 8.4 |
| $C_3H_8$ | 1.2 |
| $C_4H_6$ | 1.2 |
| $C_4H_8$ | 2.9 |
| $C_4H_{10}$ | 0.4 |
| Aromatic distillate | 10.4 |
| Cycle gas oil | 4.7 |
| Tar | 1.5 |
| | 100.0 |

The steam cracking of a relatively heavy hydrocarbon oil at elevated temperatures forms the subject matter of another application filed concurrently herewith in the name of Brook I. Smith Serial No. 372,853. The showing is included in this case in order to illustrate a complete process. As disclosed in the other application, the condensate oil withdrawn through line 54 is preferably used as reflux in towers 22 and 42 and as quench through line 38.

The fractionating section 45 is under a pressure of about 7 pounds per square inch and the vapors passing overhead through line 46 are at a temperature of about 230° F. These vapors are cooled by passing through a condenser 56 to condense water and normally liquid hydrocarbons and the cooled and condensed constituents are introduced into a separating drum 58. The condensed water settles as a bottom layer in the drum 58 and is withdrawn through a water draw-off pot 62. The condensed hydrocarbons form an upper layer on the water and are withdrawn through line 64. The uncondensed hydrocarbons leave the top of the drum 58 as vapors through line 66 and are introduced into a knock-out drum 68 for separating any entrained liquid from the vapors.

Any separated liquid is withdrawn from the bottom of the drum 68 through line 72 and mixed with the liquid withdrawn from separating drum 58 through line 64. The knock-out drum 68 is under a pressure of about 2 pounds per square inch and at a temperature of about 110° F. The vapors pass overhead from drum 68, through line 74 and are compressed by compressor 76 and cooled in a cooler 78. The cooled and compressed vapors are passed through line 82 and into an inter-stage knock-out drum 86 which is under a pressure of about 40 pounds per square inch and at a temperature of about 120° F. Introduced into the drum 86 is the hydrocarbon liquid withdrawn from the first drum 58, the liquid being passed through line 64 by means of pump 87.

In the intermediate drum 86 there is a separation of water, liquid hydrocarbons and vapors and gases. In the compression and cooling of the gases passing through line 74 additional quantities of hydrocarbons and water are condensed. The water is withdrawn as a bottom layer through line 88. The liquid hydrocarbons form an upper layer on the water and are withdrawn through line 92.

The uncondensed hydrocarbons leave the top of the intermediate drum 86 by means of line 94. These vapors are compressed in passing through compressor 96 and are then cooled and partly condensed in a cooler 98. The cooled and compressed vapors and gases are passed through line 102 where they are mixed with liquid withdrawn from the intermediate drum 86 and passed through line 92 by means of pump 104. The mixture of gases, vapors and liquid is introduced into a last drum 108 which is under a pressure of about 175 pounds per square inch and at a temperature of about 120° F.

During cooling of the compressed gas passing through line 94, there is further condensation of water and hydrocarbons which accumulate as separate layers in the last drum 108. The water is withdrawn from the bottom of the drum through line 112. The liquid hydrocarbons are withdrawn through line 114 from the drum 108. The uncondensed hydrocarbons comprising vapors and gases are passed overhead through line 116 and are further treated as will be described in greater detail hereinafter.

The liquid hydrocarbons are withdrawn from the drum 108 by means of pump 118 and passed through a heat exchanger 122 for preheating the liquid hydrocarbons. The preheated hydrocarbons are then passed through line 123 to a fractionating tower 124 for separating normally liquid hydrocarbons from $C_4$ and lighter hydrocarbons. The fractionating tower 124 may be called a debutanizing tower. The tower 124 is maintained under a pressure of about 185 pounds per square inch.

Heat is supplied to the bottom of the tower for vaporizing the hydrocarbons and they are fractionated as they pass upwardly through the tower 124. Condensate oil is withdrawn from the bottom of the tower 124 through line 128 and introduced into reboiler 132 where the condensate oil is indirectly contacted with hot oil at a temperature of about 600° F. circulating through coil 133. The circulating oil stream is preferably heated in the convection section of the conversion furnace 34 as is shown in greater detail in application Serial No. 372,855 referred to hereinbefore. In this reboiler light constituents are vaporized from the condensate oil and returned to the fractionating tower 124 through line 134 at a temperature of about 405° F. The stripped condensate oil is withdrawn from the reboiler 132 through line 136 and the hot condensate is passed through the heat exchanger 122 above referred to for preheating the charge to the tower 124 and at the same time cooling the condensate oil.

This condensate oil comprises a relatively heavy aromatic fraction containing gasoline constituents and containing substantial amounts of benzene, toluene, xylene and higher aromatic compounds. The aromatic fraction is further cooled by passing through the cooler 138 and is then passed through line 142 to a storage tank or the like 144 for the relatively heavy aromatic fraction.

The uncondensed vapors leave the top of the fractionating tower 124 through line 146 at a temperature of about 163° F. The vapors are passed through a condenser 148 and then to a separator 152 for separating liquids from vapors. The liquids are withdrawn from the bottom of the separator 152 through line 154 and returned to the top of the tower 124 as reflux by means of pump 156.

The separated vapors leave the top of the separator 152 through line 158 and are combined with the uncondensed vapors leaving the top of the last drum 108 above described and this mixture is further treated as will be presently described.

From the above, it will be seen that only the liquid hydrocarbons from the last drum 108 are passed to the fractionating tower 124 and the separated vapors from the drum 108 are not passed through the fractionating tower 124 but are mixed with the vapors resulting from the fractionation in the fractionating tower 124. In this way it is possible to fractionate the hydrocarbons in the tower 124 at a lower pressure and higher temperature than would be otherwise necessary if the liquid and vapors from the last drum 108 were both introduced into the tower 124.

The mixture of vapors from the drum 108 and the separator 152 has about the following composition:

| | Mol. percent |
|---|---|
| $H_2$ | 7.2 |
| $CH_4$ | 24.8 |
| $C_2H_4$ | 25.8 |
| $C_2H_6$ | 10.3 |
| $C_3H_6$ | 16.5 |
| $C_3H_8$ | 2.3 |
| $C_4H_6$ | 2.6 |
| $C_4H_8$ | 6.6 |
| $C_4H_{10}$ | 1.0 |
| $C_5+$ | 2.9 |
| | 100.0 |

The mixture is preferable passed through a scrubber 162 where it is scrubbed with caustic soda or any other suitable reagent for the removal of sulfur compounds and the scrubbed vapors and gases are then passed through line 164, cooled first by passing through the cooler 166 and then by indirect contact with cold propylene gas or by evaporation of liquid propylene in exchanger 168. By this refrigeration, some of the heavier hydrocarbons may be condensed and the refrigerated vapors are passed through line 172 and introduced into a separating drum 174 for separating condensed hydrocarbons from vapors. The vapors introduced into the separating drum 174 are under a pressure of about 170 pounds per square inch and at a temperature of about 80° F. The separated liquid hydrocarbons are withdrawn from the bottom of the drum 174 and passed through line 176 by pump 177 and returned to the last drum 108 which is at a higher temperature and lighter constituents are removed from the liquid hydrocarbons.

The separated vapors leave the separating drum 174 through line 178 and are passed through line 180, open valve 181 and into the first drier or dehydrator 182 which contains a suitable dehydrating agent such as activated alumina 183. It is necessary to remove substantially all of the water vapor from the gases being treated in this process due to the relatively low temperatures used in the subsequent fractionation steps. If the water vapor were not removed, ice or hydrates would be formed in the cold parts of the equipment and the lines would clog up and it would be necessary to stop the process to remove ice formations.

Another drier dehydrator 188 is shown. Any number of dehydrators may be used. While one dehydrator is being use, another or other dehydrators are being revivified to prepare them for the use in the process. When the dehydrator 182 is being used, the remaining valves are closed to prevent hydrocarbon vapors from line 178 from passing through the other dehydrator.

The dehydrated vapors leave the dehydrator 182 through line 192, the valve 193 being open. The dehydrated vapors are then passed through a compressor 194 where they are compressed to a pressure of about 600 pounds per square inch. The compressed gases are then passed through a cooler 196 which is cooled by any suitable liquid such as water passing through a coil 197. The preliminarily cooled and compressed charge is then refrigerated by being passed through a heat exchanger or refrigeration zone 198 where it indirectly contacts a refrigerant such as propylene to reduce the temperature of the charge to a relatively low figure.

The refrigerated compressed charge is introduced into a first fractionating tower 202 which is under a pressure of about 575 pounds per square inch. The introduced hydrocarbons are fractionated in the tower 202 to separate lighter hydrocarbons from heavier hydrocarbons. The fractionating tower 202 is provided with a top bubble cap plate 204 upon which liquid collects as shown at 206. Dipping under the surface of the liquid 206 is a pipe 208 which is associated with a higher plate 212 which is not a bubble plate upon which liquid accumulates as shown at 214. The liquid 214 comprises a seal for the pipe 208. Uncondensed vapors are withdrawn from the space above the top plate 204 by means of line 216 and passed through a refrigerated cooler or refrigeration zone 218 to reduce the temperature of the vapors to about —50° F. The refrigeration is accomplished by the evaporation of propylene at —65° F. By cooling to —50° F., certain of the relatively higher molecular weight hydrocarbons in the vapors are liquefied. The refrigerated hydrocarbons are then returned to the top of the tower 202 by means of line 222 as reflux. The liquefied constituents accumulate on sealing plate 212 and excess quantities thereof are drained from plate 212 by means of tube 208.

The uncondensed vapors leave the top of the tower 202 from the space above the liquid shown at 214 and are passed through line 224. These uncondensed gases contain ethylene, methane and hydrogen and comprise a dilute ethylene fraction which may be used as such without further treatment in the preparation of organic compounds such as ethyl chloride, etc. This dilute ethylene fraction has about the following composition:

|  | Mol. per cent |
|---|---|
| $H_2$ | 15.0 |
| $CH_4$ | 51.0 |
| $C_2H_4$ | 26.6 |
| $C_2H_6$ | 7.4 |
|  | 100.0 |

This dilute ethylene fraction is at a very low temperature and is preferably used for cooling purposes before it is utilized in the manufacture of other compounds. The steps of cooling with this dilute ethylene fraction will be described later in the process.

The condensate from the bottom of the first tower 202 is withdrawn through line 226 and passed into a reboiler 228 wherein its is indirectly heated by means of steam passing through coil 232. The lower molecular weight hydrocarbons are vaporized from the condensate and returned to the tower 202 by means of line 234. These vapors are at a temperature of about 115° F. The unvaporized condensate oil is withdrawn from the reboiler 228 through line 236 having a pressure reducing valve 238 and is introduced into a second fractionating tower 242 for separating lighter constituents from heavier constituents. The tower 242 is maintained under a pressure of about 425 pounds per square inch. Heat is supplied to the bottom of the tower for vaporizing the hydrocarbons and the hydrocarbon vapors are fractionated as they pass upwardly through the tower 242.

The condensate liquid is withdrawn from the bottom of the tower 242 through line 244 and passed into reboiler 246 which is indirectly heated by steam or the like passing through a coil 248. In the reboiler certain lighter hydrocarbons are vaporized from the condensate oil and the vaporized hydrocarbons are returned to the bottom of the tower 242 by means of line 252. These separated vapors are at a temperature of about 156° F. The unvaporized condensate liquid is withdrawn from the reboiler 246 and passed through line 254 having a pressure reducing valve 256 and introduced into a third fractionating tower 258 wherein further fractionation is effected as will be presently described.

Returning now to the lighter constituents passing overhead from the second fractionating tower 242 it will be seen that the upper portion of the tower 242 is of a construction similar to that shown in the first fractionating tower 202. A top bubble cap plate 262 is provided on which liquid shown at 264 accumulates. The tubular member 266 dips under the surface of the liquid 264 and communicates with a sealing plate 268 upon which liquid accumulates as shown at 272. Uncondensed vapors or gases are withdrawn from the space above the top plate 262 by means of line 274, passed through a refrigerating zone 276 where the vapors are cooled to about 13° F. and certain of the relatively higher molecular weight hydrocarbons in the vapors are condensed. The refrigerated mixture contains liquefied hydrocarbons and is returned to the top of the fractionating tower 242 by means of line 278. The liquefied hydrocarbons are separated and act as reflux for the top of the tower 242. The uncondensed gases are withdrawn from the top of the fractionating tower 242 through line 282. This fraction contains mostly ethylene and may be described as a concentrated ethylene fraction having about the following composition:

|  | Mol. per cent |
|---|---|
| $CH_4$ | 1.9 |
| $C_2H_4$ | 90.0 |
| $C_2H_6$ | 7.1 |
| $C_3H_6$ | 1.0 |
|  | 100.0 |

This fraction may be used as a starting product for the manufacture of organic chemicals such as ethyl chloride, etc.

The condensate liquid introduced into the third fractionating tower 258 is under a pressure of about 330 pounds per square inch and heat is supplied to the bottom of the tower to vaporize the hydrocarbons and to remove lower molecular weight hydrocarbons overhead. Fractionated vapors leave the top of the tower 258 through line 284, are cooled and condensed by being passed through condenser 286 and the cooled and condensed vapors are passed through line 288 into a receiving drum 292. A portion of the liquid is withdrawn from the bottom of the drum 292 and returned to the top of the tower 258 as reflux through line 294 by pump 296. The remaining low boiling or lower molecular weight hydrocarbons collecting in the drum 292 are withdrawn as vapors overhead through line 298 and a portion thereof is removed as a $C_3$ fraction, the rest being added to replace refrigerant lost in the refrigeration system which will be described hereinafter in greater detail. In this way water-free refrigerant is added to the refrigeration system. The fraction separated as the overhead fraction from the tower 258 comprises a $C_3$ cut having about the following composition:

|  | Mol. per cent |
|---|---|
| $C_2H_4$ | 2.1 |
| $C_2H_6$ | 24.5 |
| $C_3H_6$ | 65.5 |
| $C_3H_8$ | 7.4 |
| $C_4+$ | 0.5 |
|  | 100.0 |

The separated fraction comprising $C_3$ hydrocarbons is passed through a condenser 299 and under a pressure of about 320 pounds per square inch and at a temperature of about 95° F. is introduced into an accumulator or the like 300. The $C_3$ cut under pressure is withdrawn from the tank 300 by means of line 301 and forms a part of the refrigeration system later to be described. Most of the $C_3$ fraction is removed from the system through line 302 by pump 304. This fraction may be used in any desired manner for the manufacture of other compounds but is particularly adapted for polymerization units. If it is so desired the $C_3$ cut may be withdrawn from the system as a gas by passing from line 298 to line 304' to a polymerization plant or the like.

It will be seen that the $C_3$ cut contains a relatively large amount of ethane, namely, about 24.5 mol. percent and due to the presence of ethane in the mixture, lower refrigeration temperatures are obtained for the same pressure than where a relatively pure C₃ cut is used. In this way better cooling is obtained with this particular fraction recovered from the system.

The condensate liquid from the bottom of the fractionating tower 258 is passed through line 305 into a reboiler 306 which is indirectly heated by means of live steam passing through coil 307. Vaporized constituents pass overhead through line 308 at a temperature of about 218° F. and are returned to the bottom of the tower 258. The unvaporized condensate oil is withdrawn from the reboiler 306 and passed through line 312 having a pressure reducing valve 314 into the fractionating tower 316.

The last fractionating tower 316 is provided with heating means at the bottom thereof for heating and vaporizing the hydrocarbons introduced into the tower 316. The fractionated vapors leave the top of the tower 316 through line 318, are cooled and condensed by passing through condenser 322 and are introduced into the separator 324 by means of line 326. Liquid accumulating in the separator 324 is withdrawn from the bottom thereof through line 328 and passed to the top of the tower 316 by pump 332 as reflux liquid. The cooled vapors separated in the separator 324 comprise a C₄ fraction which is withdrawn through line 334. This C₄ fraction has about the following composition:

| | Mol. per cent |
|---|---|
| C₃H₆ | 7.6 |
| C₃H₈ | 4.7 |
| C₄H₆ | 21.4 |
| C₄H₈ | 57.6 |
| C₄H₁₀ | 7.7 |
| C₅ | 1.0 |

This C₄ fraction contains some butadiene which is preferably removed from the C₄ fraction. The C₄ fraction free of butadiene may be treated in any suitable manner to produce desired hydrocarbons. The fractionating tower 316 is under a pressure of about 85 pounds per square inch.

The condensate liquid remaining after fractionation is withdrawn from the bottom of the tower 316 through line 336 and passed into a reboiler 338 which is indirectly heated by live steam introduced into a coil 342. Some of the lower molecular weight hydrocarbons are vaporized from the condensate liquid and are introduced into the bottom portion of the tower 316 through line 344. The unvaporized condensate liquid is withdrawn from the reboiler 338 by means of line 346 and comprises a light aromatic fraction containing gasoline constituents and containing substantial amounts of benzene, toluene, xylene and higher aromatics. This aromatic fraction may be used as such but it is preferably blended with the aromatic fraction withdrawn from the bottom of the debutanizer tower 124 and stored in tank 146.

The refrigeration system will now be described. The C₃ fraction containing liquefied ethane, propane and propylene under a pressure of about 320 pounds per square inch and at a relatively low temperature of about 95° F. is withdrawn from the tank 300 and passed through line 301 by means of pump 352. The C₃ fraction is passed through a cooler 354 through which water is passed by means of a coil 353 to reduce the temperature of the C₃ fraction. In order to further cool the C₃ fraction, it is passed through a heat exchanger 356 wherein it is indirectly contacted with the dilute, cold ethylene fraction passing through line 224 as above described. The C₃ fraction leaving the heat exchanger 356 is at a temperature of about 65° F.

The C₃ fraction is now used for refrigerating certain portions of the fractionation system. One portion of the C₃ fraction is passed through line 358 having a pressure reducing valve 362 and then through refrigerating zone 276 for cooling the overhead gases from the fractionating tower 242 from which concentrated ethylene is taken overhead. Due to the pressure reducing valve 362, the pressure on the C₃ fraction is reduced to about 54 pounds per square inch absolute with a consequent reduction in temperature to about −2° F. The C₃ cut is cooled to this temperature by the vaporization of a portion of the C₃ cut. The liquid and gaseous C₃ cut at a temperature of about −2° F. enters the refrigeration zone 276. Vapors from fractionating tower 242 enter the refrigeration zone 276 through line 274 and are cooled by evaporation of the liquid portion of the C₃ cut. The vaporized C₃ constituents are then passed through line 363 and are recompressed and cooled as will be presently described.

Another portion of the liquefied C₃ fraction is passed through line 364 having a pressure reducing valve 366 and the vaporized C₃ constituents pass through the refrigeration zone 198 for chilling the dehydrated and compressed fraction being introduced into the first fractionating tower 202 from the top of which a dilute ethylene fraction is recovered. The vaporized C₃ constituents are then passed through line 368 and mixed with the vaporized C₃ constituents passing through line 363, the mixture being passed through line 372 to an intermediate drum 374 under a pressure of about 53 pounds per square inch absolute before being recompressed as will be presently described.

Another portion of the liquefied C₃ constituents is passed through line 376 having a pressure reducing valve 378 and through the refrigeration zone 218 which is arranged above the first fractionating tower 202 from which the lighter constituents are withdrawn overhead as a dilute ethylene fraction. Due to the pressure reduction, the C₃ constituents are vaporized in the refrigeration zone 218 to cool the gases passing therethrough in line 216 and the vaporized C₃ constituents leave the refrigeration zone 218 at a temperature of about −65° F. Due to this low temperature, the C₃ constituents are preferably used in an additional cooling stage. The C₃ vapors from the refrigeration zone 218 are passed through line 382 and through the refrigeration zone 166 wherein they indirectly contact vapors being passed to the separator 174 ahead of the dehydrators 182 and 188.

In obtaining the low temperature required for the refrigeration zone 218, it was necessary to reduce the pressure to a low figure. The pressure on the C₃ constituents leaving the refrigeration zone 218 is much lower than the pressure on the refrigerant leaving the other refrigeration zones above-described. The refrigerant at the low pressure is passed through line 384 to a drum 386 under a pressure of about 9 pounds per square inch absolute. The C₃ vapors are withdrawn from the drum 386 and compressed in compressor 388 to about 53 pounds per square inch absolute and introduced into the second drum 374. The C₃ vapors from the other refrigeration zones are also introduced into the drum 374 by means of line 372 as above-described.

The compressed vapors are then passed through a second compressor 394 and are compressed to a pressure of about 325 pounds per square inch and introduced into a third drum 396. From the drum 396, the compressed C₃ constituents are passed through line 398, are mixed with the C₃ fraction separated from the gaseous mixture being fractionated and passing through line 296, the mixture being passed through the cooler 299 before being introduced into the tank 300.

Returning now to the dehydrating or drying system. After the dehydrator 182 has been in service for a certain length of time, it will become inactivated due to the adsorption of water vapor from the gases being dehydrated. When the dehydrator 182 becomes inactivated, it is taken out of the system and another dehydrator such as 188 is introduced into the system. To take the dehydrator 182 out of the system valves 402 and 404 associated with dehydrator 188 are opened and valves 181 and 183 are closed so that the gas to be dehydrated passes through the dehydrator 188. A heated fluid is then passed through the dehydrator 182 to remove moisture from the alumina therein. Preferably natural gas is used but other hydrocarbon mixtures, or other gases or agents may be used. The hydrocarbon gas is preferably passed through a coil in the vaporizing furnace 16 (through lines not shown) and heated to a temperature of about 600° F. and then passed through line 406, open valve 408, dehydrator 182, and line 414 having the valve 416 open. The drying gas is then passed through line 418, cooler 422 and then passed through line 424 for use as fuel or for any other desired purpose.

After the alumina in dehydrator 182 is reactivated, the flow of heated gas therethrough may be stopped. The dehydrator is then at a relatively high temperature and it is preferably cooled by by-passing a portion or all of the cold dilute ethylene fraction from line 224 through line 426 having a valve 428 and also preferably a strainer (not shown). The cold dilute ethylene fraction is then passed through line 432, open valve 434, then through the dehydrator 182, then through line 438 having a valve 442 and then through line 418, cooler 422 and then through line 424 from which the dilute ethylene fraction is removed through line 444. When the dehydrator 182 is sufficiently cool, the flow of the cold dilute ethylene fraction therethrough is stopped and the dehydrator is then ready for reuse.

The other dehydrator 188 is similarly treated to reactivate the alumina and to cool the alumina after it has been dried. With valve 408 closed, the heated hydrocarbon drying gas is passed through line 406, open valve 446, dehydrator 188, valve 447 and line 448 and then through line 418, cooler 422 and outlet line 424.

After the alumina in dehydrator 188 is dried, the flow of hot hydrocarbon gas is stopped and the cold dilute ethylene fraction or a portion thereof is passed through line 432 and with valve 434 closed, the dilute ethylene fraction passes through open valve 449 through the dehydrator 188 and then through open valve 452 in line 454 and then through line 418, cooler 422 and outlet line 444. Instead of using the cold ethylene fraction, other refrigerants or cooling means may be used to cool the dehydrators.

While the process is especially adapted for separating desired fractions from cracked products, the process is also adapted for separating gaseous hydrocarbon mixtures into desired fractions, such gaseous mixtures being passed through line 46 or its equivalent, cooled, separated initially into liquid and gaseous fractions, etc. as shown in the drawings and as above described. The conditions given above in the description pertain to one gaseous mixture as an example but it is to be understood that the conditions may be varied with different gaseous mixtures or similar gaseous mixtures without departing from the spirit of the invention.

In the above description where pressures are referred to, the pressures are given in pounds per square inch gauge unless otherwise specified.

By making a rough separation in the tower 202 allowing about one half of the ethylene to be removed with the overhead fraction and the remainder of the ethylene to pass from tower 202 in the bottoms fraction containing C₂ and heavier hydrocarbons, it is possible to remove methane and hydrogen from C₂ and heavier hydrocarbons at a higher temperature level and with less refrigerated cooling required. With the methane and hydrogen removed from the remaining ethylene and heavier hydrocarbons, the remaining ethylene can be recovered in relatively concentrated form as an overhead fraction from tower 242.

While one form of apparatus has been disclosed for carrying out the fractionation process, it is to be understood that this apparatus is by way of example only and various changes and modifications may be made without departing from the spirit of the invention.

What is claimed is:

1. A method of separating lower molecular weight normally gaseous hydrocarbons from mixtures containing them which comprises compressing and cooling a gaseous hydrocarbon mixture to liquefy higher molecular weight hydrocarbons and introducing the mixture into a first separating zone, separately withdrawing liquids and gases from the said first separating zone, compressing and cooling the withdrawn gases and introducing them into a second separating zone, passing the withdrawn liquids directly to said second separating zone, withdrawing liquids and gases separately from said second separating zone, passing the liquids withdrawn from said second separating zone to a fractionating zone, fractionating said liquids to obtain a normally liquid hydrocarbon fraction containing gasoline constituents and a vapor fraction containing C₄ and lighter hydrocarbons, mixing the gases and vapors from said fractionating zone with the gases from said second separating zone, cooling the thus mixed gases and passing them to a third separating zone to separate normally liquid hydrocarbons from gases, returning the normally liquid hydrocarbons from said third separating zone to said second separating zone, removing moisture from the gases from said third separating zone, and compressing, cooling and fractionating the resulting dried gases to separate C₂, C₃ and C₄ fractions and a normally liquid fraction containing gasoline constituents.

2. A method of fractionating gaseous mixtures containing hydrocarbons and moisture which comprises drying the mixture, compressing and cooling the dried mixture, and introducing it to a fractionating zone, removing the overhead gaseous fraction, cooling said overhead gaseous fraction to a temperature of about −50° F. and returning it to said fractionating zone as a reflux, removing overhead from said fractionating zone a cold dilute ethylene gas fraction containing ethylene and methane and removing from the lower portion of said fractionating zone a condensate liquid fraction containing $C_2$ and higher hydrocarbons, each of said fractions containing about half of the ethylene, reducing the pressure on the condensate liquid and fractionating it to separate a concentrated ethylene gas fraction as an overhead fraction from a second condensate liquid containing $C_3$ and higher hydrocarbons, reducing the pressure on the second condensate and fractionating it to separate an overhead fraction containing $C_3$ hydrocarbons from a third liquid condensate containing $C_4$ and higher hydrocarbons, reducing the pressure on the third condensate and fractionating it to separate an overhead fraction containing $C_4$ hydrocarbons from a final condensate liquid containing gasoline constituents.

3. A method according to claim 2 wherein reflux for said first two fractionating steps is provided by cooling the overhead gaseous fractions of the two steps with a refrigeration medium to condense portions of said gaseous fraction and returning the thus condensed portions to the respective fractionation zones, and wherein the cold dilute ethylene gas fraction from the first fractionation step is used in part to cool the refrigeration medium.

4. A method according to claim 2 wherein driers used for drying the gaseous mixture become deactivated and are reactivated with hot gas and then cooled by using at least a portion of the cold dilute ethylene fraction as a purging gas.

5. A method according to claim 2 wherein the gaseous mixture is first cooled by indirect contact with a refrigerant to condense higher boiling constituents before the gaseous mixture is dried, using a refrigerant for providing reflux for one of said fractionation steps and then using the last mentioned refrigerant as the refrigerant for cooling the gaseous mixture.

6. A method according to claim 2 wherein reflux for the first two fractionation steps is provided by cooling the overhead gaseous fractions of the said two steps with a refrigerating medium comprising a $C_3$ hydrocarbon to condense portions of said gaseous fractions and returning the thus condensed portions to their respective fractionating zones, and wherein at least a portion of the separated $C_3$ fraction from the third fractionating step is added to the said refrigerating medium to replace refrigerant lost during the process.

7. A method of separating lower molecular weight normally gaseous hydrocarbons from mixtures containing them, which comprises compressing and cooling a gaseous hydrocarbon mixture to liquefy higher molecular weight hydrocarbons, separating liquids from gases in the cooled and compressed charge, compressing and cooling the separated gases and introducing them into a separating zone, passing the first mentioned separated liquids to said separating zone, withdrawing liquids and gases separately from said separating zone, fractionating the withdrawn liquids to separate a normally liquid hydrocarbon fraction containing gasoline constituents from gases and vapors containing $C_4$ and lighter hydrocarbons, mixing the last mentioned gases and vapors with the gases from said separating zone and cooling the mixture to condense normally liquid hydrocarbons, separating said normally liquid hydrocarbons from uncondensed gases, and returning said normally liquid hydrocarbons to said separating zone.

8. A method according to claim 7 wherein the last mentioned gases are compressed and cooled and treated to separate an ethylene containing fraction from higher boiling hydrocarbons.

9. A method of separating lower molecular weight normally gaseous hydrocarbons from mixtures containing them which comprises compressing and cooling a gaseous hydrocarbon mixture to liquefy higher molecular weight hydrocarbons, and introducing it into a separating zone, withdrawing liquids and gases separately from said separating zone, fractionating the withdrawn liquids to separate a normally liquid hydrocarbon fraction containing gasoline constituents from gases and vapors containing $C_4$ and lighter hydrocarbons, mixing the last mentioned gases and vapors with the gases from said separating zone and cooling the mixture to condense normally liquid hydrocarbons, separating said normally liquid hydrocarbons from uncondensed gases, and returning said normally liquid hydrocarbons to said separating zone.

10. A method of fractionating gaseous mixtures containing hydrocarbons which comprises drying the mixture, compressing and cooling the dried mixture and introducing it into a fractionating zone to remove an overhead gaseous fraction, cooling said gaseous fraction to a temperature of about $-50°$ F. and returning it to the said fractionating zone as reflux, removing a cold dilute $C_2$ fraction from a condensate liquid fraction containing higher hydrocarbons, each of said fractions containing about one half of the $C_2$ hydrocarbons, reducing the pressure on the condensate liquid and refractionating it to separate a concentrated $C_2$ overhead fraction from a second condensate liquid containing $C_3$ and higher hydrocarbons, reducing the pressure on the second condensate and fractionating it to separate an overhead fraction containing $C_3$ hydrocarbons from a third condensate liquid containing $C_4$ and higher hydrocarbons, reducing the pressure on the third condensate and fractionating it to separate an overhead fraction containing $C_4$ hydrocarbons from a final condensate liquid containing gasoline constituents.

11. A method according to claim 10 wherein driers used for drying the gaseous mixture become deactivated and are reactivated with hot gas and then cooled by using at least a portion of the cold dilute $C_2$ fraction as a purging gas.

12. A method according to claim 2 wherein the reflux for the first two fractionating steps is provided by cooling the overhead fractions of the two steps with a refrigeration medium comprising a $C_3$ hydrocarbon containing an appreciable amount of ethane to condense portions of said gaseous fractions, and returning the thus condensed portions to their respective fractionation zones.

13. A method of fractionating gaseous mixture which comprises fractionating a mixture containing ethylene, cooling the overhead gaseous fraction to a temperature of about $-50$ F., and returning the thus condensed portions to the fractionation zone as reflux whereby about half of the ethylene is condensed in the fractionating zone, and removing the remainder of the ethylene in a stream comprising lower boiling constituents containing methane and hydrogen.

14. A method of fractionating gaseous mixtures which comprises introducing a mixture containing ethylene into a fractionating zone, maintaining a temperature of about $-50°$ F. at the top of said fractionating zone and removing a top fraction containing hydrogen, methane and about half the ethylene and a bottom fraction containing the remainder of the ethylene in a relatively concentrated form.

15. A method of segregating gaseous hydrocarbon mixtures containing hydrogen and consisting predominately of olefinic hydrocarbons obtained from the cracking of petroleum oils into a plurality of fractions of different boiling range and molecular weight which comprises compressing a substantially dry mixture of said gases, cooling the compressed mixture to a temperature sufficient to condense about half of the ethylene and higher boiling constituents under obtaining pressure conditions but insufficient to condense constituents boiling below ethylene, separating the uncondensed gases consisting principally of hydrogen, methane and about half of the ethylene from the liquid condensate, adjusting the temperature and pressure of the liquid condensate so formed to vaporize the ethylene contained therein while retaining the higher boiling constituents in liquid phase, separating the ethylene fraction so vaporized from the remaining liquid condensate, thereafter further adjusting the temperature and pressure of the remaining condensate to vaporize another fraction therefrom, separating the vaporized fraction from the unvaporized condensate, separately condensing the vaporized fraction, and utilizing said last-named fraction as a refrigerant in the cooling of said gaseous mixture.

16. A method of segregating gaseous hydrocarbon mixtures consisting predominately of olefinic hydrocarbon gases obtained from the cracking of petroleum oils wherein the said gaseous hydrocarbon mixtures are segregated into a plurality of fractions of different boiling range and molecular weight which comprises compressing a substantially dry mixture of said gases, cooling the compressed gases to a temperature sufficient to condense about half of the ethylene and the higher boiling constituents of said gases under the obtaining pressure conditions but insufficient to condense constituents boiling below ethylene, separating the uncondensed gases consisting principally of hydrogen, methane and about half of the ethylene from the liquid condensate, adjusting the temperature and pressure on the liquid condensate so formed to vaporize the ethylene contained therein while retaining the higher boiling constituents in liquid phase, separating the ethylene fraction so vaporized from the remaining liquid condensate, and utilizing a portion of said last-named liquid condensate as a refrigerant for cooling said gases.

BROOK I. SMITH.
EDWARD G. MORIN.